(12) United States Patent
Kaule et al.

(10) Patent No.: US 6,503,603 B1
(45) Date of Patent: *Jan. 7, 2003

(54) PRINTED DOCUMENT HAVING A VALUE AND COMPRISING A LUMINESCENT AUTHENTICITY FEATURE

(75) Inventors: Wittich Kaule, Emmering (DE); Gerhard Schwenk, Puchheim (DE); Gerhard Stenzel, Germering (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,642

(22) PCT Filed: Jan. 29, 1999

(86) PCT No.: PCT/EP99/00595

§ 371 (c)(1),
(2), (4) Date: Dec. 10, 1999

(87) PCT Pub. No.: WO99/38702

PCT Pub. Date: Aug. 5, 1999

(30) Foreign Application Priority Data

Feb. 2, 1998 (DE) .......................................... 198 04 032

(51) Int. Cl.[7] .............................. B32B 3/00; B32D 15/00
(52) U.S. Cl. ........................ 428/195; 428/67; 428/199; 283/57; 283/74; 283/901; 283/904
(58) Field of Search .......................... 428/67, 80, 199, 428/204, 207, 211, 333, 403, 464, 537.7, 690, 913, 916; 283/57, 74, 113, 114, 107, 901, 904; 427/7

(56) References Cited

U.S. PATENT DOCUMENTS

| 4,183,989 A | * | 1/1980 | Tooth |
| 4,451,521 A | | 5/1984 | Kaule et al. |
| 4,452,843 A | | 6/1984 | Kaule et al. |
| 4,598,205 A | | 7/1986 | Kaule et al. |
| 5,005,873 A | * | 4/1991 | West |
| 5,599,578 A | * | 2/1997 | Butland |

FOREIGN PATENT DOCUMENTS

AU   B-34903/84   6/1985

* cited by examiner

Primary Examiner—Deborah Jones
Assistant Examiner—G. Blackwell-Rudasill
(74) Attorney, Agent, or Firm—Bacon & Thomas

(57) ABSTRACT

The invention relates to a printed valuable document with at least one authenticity mark in the form of a luminescent substance based on a host lattice doped with at least one rare earth metal. The host lattice largely absorbs in the visible region of the spectrum and is excitable in the visible region of the spectrum, and is transparent in at least parts of the IR spectral region. The rare earth metal is holmium. The luminescent substance is present in the volume of the valuable document in such a concentration that the properties of the valuable document just remain unimpaired.

32 Claims, 2 Drawing Sheets

Figure 1:
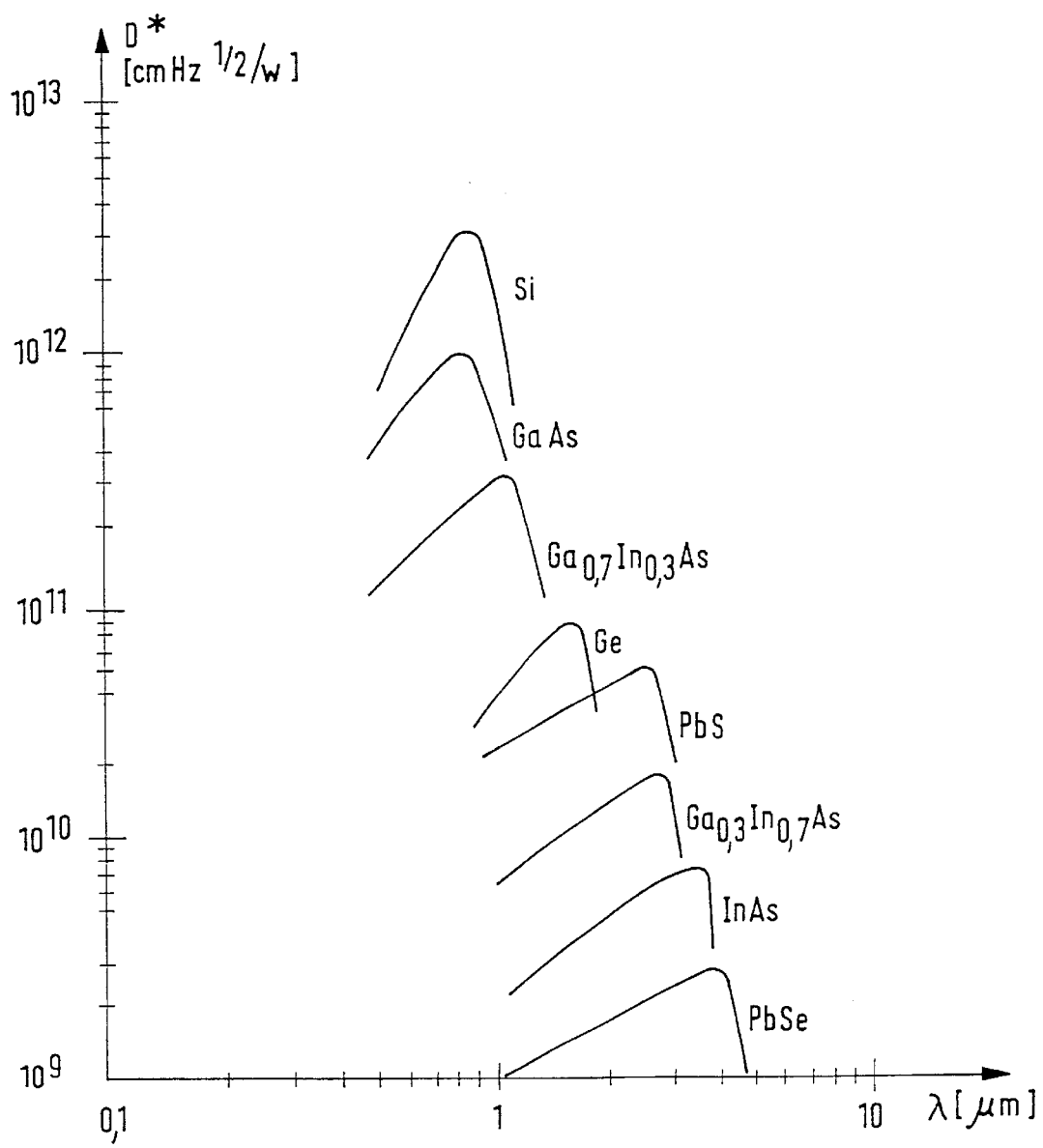

PRINTED DOCUMENT HAVING A VALUE AND COMPRISING A LUMINESCENT AUTHENTICITY FEATURE

The invention concerns a printed valuable document with at least one authentication mark in the form of a luminescent substance based on a host lattice doped with at least one rare earth metal, The protection of valuable documents by means of luminescent substances has long been known. The use of rare earth metals in this connection has also been discussed. These have the advantage of possessing narrow band emission lines, which are particularly characteristic, and can therefore be safely distinguished from the emissions of other substances when using measuring technology Preferably substances are used that have emission lines in the invisible region of the spectrum, particularly in the impaired (IR) spectral region.

In order to enhance protection against counterfeiting still Per, the rare earth metals can be incorporated with other substances into host lattices in such a way that the excitation and/or emission spectrum of the rare earth metal is influenced in a characteristic manner. Through combination with suitable absorptive substances, for example, a part of the excitation and/or emission ranges of the rare earth metal can be suppressed. The influence, however, may also take the form of a "distortion", e.g. through damping of particular areas of the excitation or emission spectra.

Taking this prior art as a starting point, the objective of the invention is to create a valuable document with an authentication mark in the form of luminescent substances, which in comparison with the prior art are more difficult to detect and therefore offer greater security against counterfeiting.

The fulfillment of this aim is given by the nondependent claims. Further embodiments are the subject of the dependent claims.

As has already been indicated, for examining the authenticity of valuable documents, use is made of the emission lines in the IR spectrum range of the rare earth metals. Preferably, use is made of emission lines which lie in the near IR spectral region, since these can still be detected with economically-priced sensors and because, thanks to the favorable signal-to-noise ratio, measurement errors can be avoided relatively easily. Use is usually made for this purpose of conventional commercial silicon (Si) or germanium (Ge) detectors. The further into the IR spectral region the emission lines lie, the more difficult it is to detect the emission. In very general terns, the principle applies that the detection sensitivity or response sensitivity of photo detectors decreases with increasing wavelength of the radiation to be measured. This means that the signal-to-noise ratio of the detected signals generally becomes smaller as the wavelength increases. As a consequence, the measurement technology for the evaluation of the signals and the expertise required become more and more elaborate. If, in addition, these luminescent substances, which are technically difficult to detect, are only present in small concentrations in the valuable documents to be examined, detection of the emission lines is only possible under special conditions The invention is based on recognition that the detection of certain specific substances, which becomes difficult with increasing emission wavelength in the IR spectral region, can be used to very great advantage in increasing protection against counterfeiting.

According to the invention, therefore, a luminescent substance is used for safeguarding valuable documents, having an emission spectrum lying outside the response sensitivity of Si or Ge detectors. In this case, recourse must be made, for example, to lead sulphide (PbS), indium arsenide (InAs), gallium-indium-arsenide (Gas), or lead selenide (PbSe) detectors. Their detection sensitivity, however, is less by powers of ten than that of Si detectors. In addition, the evaluation of signals from such a detector with measuring technology is markedly more difficult.

The substances which are suitable for assuring authenticity may be substances based on host lattices doped with holmium. Holmium has emission lines with wavelengths in the region of 2 $\mu$m, and therefore can no longer be detected with Ge detectors, since the response sensitivity of Ge detectors in the range from 1900 nm tends towards zero. With the appropriate amount of effort, the substances according to the invention, however, can be detected with the aid of PbS detectors. Since the response sensitivity of PbS detectors in the 2 $\mu$m wavelength region is already very low, the holmium must be used in a host lattice which will guarantee the highest possible effectiveness of the holmium, i.e. which will provide for the highest possible quantum yield. According to the invention, host lattices are used containing components which absorb light over a broad band, and transfer the absorbed energy to the holmium with a high degree of efficiency. Preferably, the quantum yield of the luminescent substances according to the invention lies in the range between 50 and 90%.

In addition to this, according to the invention provision is made for the luminescent substances in the individual valuable document to be used in a such a concentration that the properties of the valuable document are not impaired. The maximum concentration depends on a number of different parameters, such as the manner of introduction or the desired properties (colour etc.) of the valuable document.

If the luminescent substance is embedded in a paper pulp, for example, the concentration of foreign substances which is just still permissible is a few percentage points by weight. If the permissible concentration of foreign substances is exceeded, this will result in evident changes to the properties of the material. Too high a concentration of foreign substances in the paper, for example, will reduce the tear resistance of she paper. If the luminescent substance has its own colour, it may be possible that a concentration of about 0.1% by weight will already be sufficient to change the colour of the paper as a whole. An excessive concentration of foreign substances in printing inks makes the colours brittle and reduces their adhesion to the surface of the document. In this case, too, a concentration of just 1% by weight of a coloured luminescent substance may be sufficient to impair the overall colour impression of the printing ink. If this luminescent substance serves simultaneously as an ink pigment, the limit concentration may, on the other hand, only be reached at the maximum physically possible proportion of solids, of about 80% by weight.

According to the invention, the lower limit concentration in the case of colourless or lightly coloured luminescent substances, when mixed into the paper pulp, is 0.1% by eight. With more strongly coloured luminescent substances, the limit concentration may be as low as 0.01% by weight. Preferably, the concentration lies in the range between 0.05 and 1% by weight. The lower limit concentration of the luminescent substance in a layer applied to the valuable document, by contrast, is about 1% by weight, for example for coloured luminescent substances. Depending on the composition of the layer and its purpose, the concentration lies in the range between 1 and 40% by weight, and preferably in the range between 10 and 30% by weight.

The introduction of the luminescent substances in concentrations which are just still permissible, i.e. which do not change the given properties of the valuable document, hinders attempts at counterfeiting whereby, in ignorance of the true luminescence substances, less effective substitute substances with similar emission lines are used; then, however, in order for measurable signals to be obtained, higher concentrations of the substitute substances must be introduced to the valuable document. This leads to identifiable changes in the document or the printing ink containing the luminescent substance. In the case of coloured substances, for example, this would also lead to a discoloration of the valuable document or of the colour of the printing ink.

The luminescent substances can, according to the invention, be applied to the valuable document in a variety of ways. Thus, for example, as already mentioned, the luminescent substances can be mixed into a printing ink which contains additional visible colour additives. Addition of the luminescent substances to the paper pulp is also possible. Likewise, the luminescent substances can also be provided on or in a plastic substrate material, which is at least partly embedded, for example, in the paper pulp. The substrate material in this case can take the form of a security thread, a mottling fiber, or a planchet.

The plastic or paper substrate material can, however, be attached to any other object desired, for the purpose of product security, for example. The substrate material in this case is preferably formed into a label. If the substrate material is a constituent part of the product to be secured, such as is the case with a tear-off thread, for example, any other shape is naturally also possible. In certain specific application instances it may be a good idea for the luminescent substance to be applied as an invisible coating on the valuable document. In this situation, it may be present full-surface or in the form of specific patterns, such as stripes, lines, circles, or even in the form of alphanumeric signs. In order to guarantee the invisibility of the luminescent substance, use must be made according to the invention either of a colourless luminescent substance in one maximum concentration for the printing ink or the coating material, which is still just short of interfering with the properties of the coating, or a coloured luminescent substance is used in such a low concentration that the tenancy of the coating is still just maintained.

The term "valuable document" in the context of the invention is to be understood to mean bank notes, cheques, shares, stamps, identity cards, credit cards, passes, and other documents, as well as labels, seals, packing, or other elements for protecting products.

The luminescent substances according to the invention feature emission spectra which lie so far into the IR spectrum range that they ran only just be detected with the detectors available for this range with a great deal of technical effort if they are mixed into the valuable document to be marked in the maximum quantity which can be added without changing the document.

Luminescent substances of this nature are designated hereinafter as "limit luminescent substances".

By contrast with other luminescent substances which do not lie at these limits, these substances possess the technical advantage from the security point of view that they are practically unused in other technical fields, and therefore are not commercially available. In addition, the technology required to detect their presence is so elaborate that the risk of analysis of the measurement parameters is relatively low. Moreover, even if the existence of the luminescent substance were known to a forger, he could only replicate it, as already explained, by exactly duplicating all the parameters responsible for the luminescence. Luminescent substances will poorer properties will either create a lasting change in the properties of the valuable document, or will no longer be capable of being detected in the detection devices.

Further embodiments and advantages of the invention are explained hereinafter on the basis of the diagrams and the examples.

FIG. 1 Detection sensitivity of various different detectors

Figure 2:
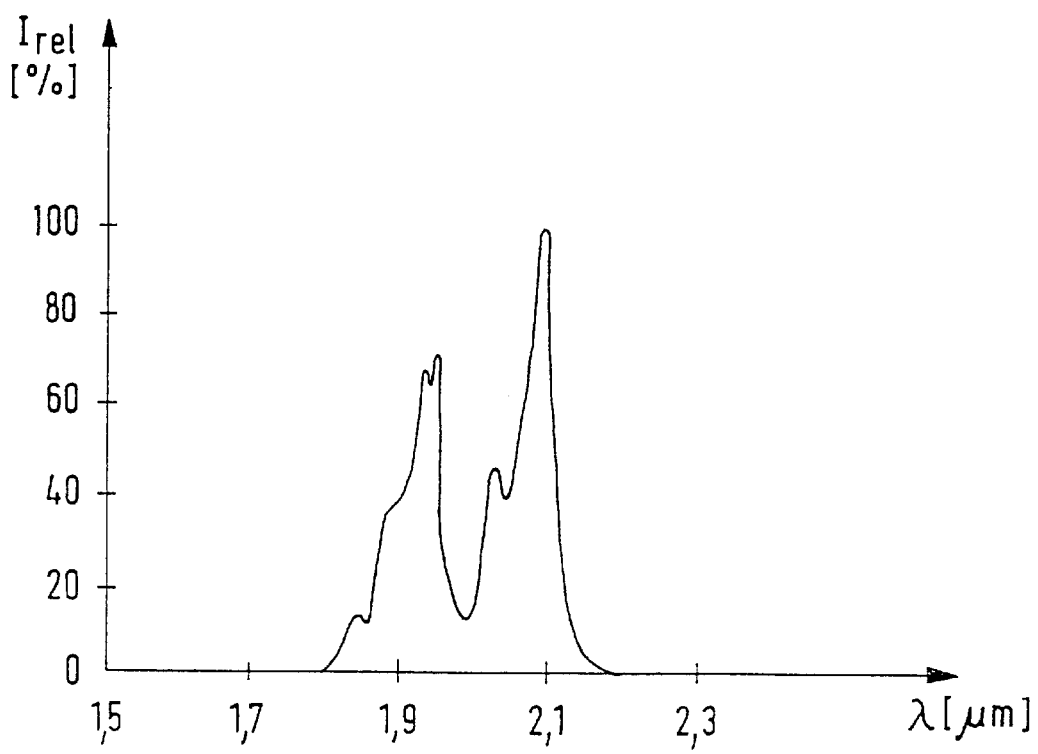
Figure 3:
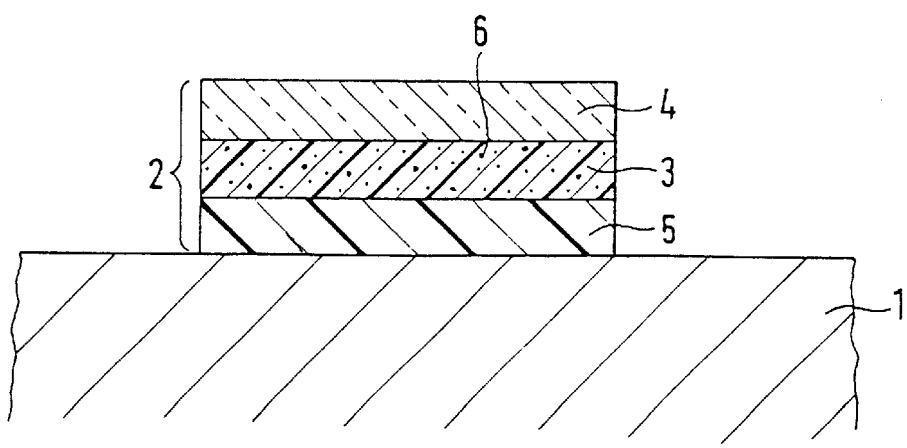

FIG. 2 Emission spectra of a limit luminescent substance according to the invention FIG. 3 Security element according to the invention in cross-section FIG. 1 shows the detection sensitivity D* of various detectors as a function of the wavelength $\lambda$. This is a measure of the response sensitivity of the detector. For reasons of easy overview, the curves are represented only in the area of their maximum sensitivity. It follows from this figure that Si and GaAs detectors can no longer be used in the range above 1.1 $\mu$m. The sensitivity of gallium arsenide can be displaced fixer into the IR spectral region by the addition of indium. Accordingly, a $Ga_{0.7}In_{0.3}$ As detector can be used up to about 1.2 $\mu$M, while a $Ga_{0.3}In_{0.7}$ As detector cab be used up to about 3 $\mu$m. However, in this range the detection capacity drops off sharply. It can further be seen from this diagram that Ge detectors can be used up to about 1.8 $\mu$m, and that in the range up to 3 $\mu$m PbS detectors are preferably used, or appropriately adapted $Ga_xIn_{x-1}$ As detectors. The index X in this situation is selected in such a way that the maximum detection sensitivity lies at the desired limit wavelength. In principle, InAs or PbSe detectors can also be used. Their detection sensitivity is, however, less by a power of ten than that of PbS detectors. In addition, the maximum detection sensitivity is already in the wavelength range between about 3 and 4 $\mu$m, with the result that it is not ideally suited for detecting the existence of holmium.

In FIG. 2, the emission spectrum is shown of a limit luminescent substance doped with holmium, according to the invention. The emission lines of the holmium in the visible and, possibly, in the near IR region, are suppressed by absorptive substances in the host lattice. As can be seen from FIG. 2, holmium emits in the wavelength range between 1.8 and 2.1 $\mu$m, and in this case, particularly in the range between 1.9 and 2.1 $\mu$m. If this emission spectrum is compared with the detection sensitivity curves of the sensors shown in FIG. 1, then it can be seen that the emission spectrum of the limit luminescent material according to the invention cannot be detected with detectors of high detection sensitivity, i.e. with Si or GaAs detectors. Even with Ge detectors, whose maximum detection sensitivity is displaced further into the IR spectral region, the emission specter shown in FIG. 2 cannot be measured. Only with PbS detectors is such detection possible. These detectors are, however, less sensitive and silicon by a power of about two powers of ten. This means that the signal-to-noise ratio is substantially worse than with Si detectors, and that a more elaborate technical measurement effort is required to evaluate the luminescence signal of the limit luminescent substance. According to the invention, however, it is precisely this situation which is utilized to increase security against counterfeiting.

The host lattice for the visually-active holmium according to the invention has an optically transparent region in the wavelength range between 1 $\mu$m and 10 $\mu$m. The host lattice according to the invention further contains, as absorptive elements, iron or chromium, which absorb in practically the entire visible region of the spectrum, and therefore, instead of the individual excitation lines of the holmium which occur in this range, they have an excitation range which is better adapted to broad-band light sources.

Preferably, the limit luminescent substances according to the invention have a garnet or perovskite structure. In order to guarantee the highest possible effectiveness of the holmium, in the case of a garnet structure host lattices are used with the general formula:

$$A_3M_{5-x}Al_xO_{12}$$

where A represents an element from the group of scandium (Sc), yttrium (Y), lanthanum (La), and gadolinium (Gd); M stands for iron (Fe) or chromium (Cr); and the index x fulfills the condition 0<x<4.99, and preferably 0.5<x<2. According to a preferred embodiment, the lattice consists of an yttrium-aluminum iron garnet.

In a further preferred embodiment, the garnet structure can be described by the formula $$A'_{3-y}A_yM_{5-x}Al_xO_{12}$$

where A, A' stands in each case for an element from the group yttrium (Y), gadolinium (Gd), scandium (Sc), and lanthanum (La); M stands for iron (Fe) or chromium (Cr); and the index x fulfills the condition 1<x<4.99, and preferably 0.5<x<2, and the index y fulfills the condition 0<y<3. For a preferred embodiment of the luminescence substance, there follows from this, for y=1, the formula $$A'Y_{2-z}Ho_zFe_{5-x}Al_xO_{13}$$

where the index z fulfills the condition 0.05<z<2, and preferably 0.15<z<0.25.

By means of the proportion of non-absorbent aluminum, the absorption and therefore the brightness of an inherent colour that the substance may possess can be adjusted, so that the luminescent substance can also be used in higher concentrations as an additive for lighter prinong inks.

If a perovskite structure is used for the host lattice, this can be described by the general formula $$AMO_3$$

where

A stands for an element from the group of scandium (Sc), yttrium (Y), and the lanthanides, and M stands for iron (Fe) or chromium (Cr).

The preferred embodiment for the limit luminescent substance in a perovskite structure can be described by the formula $$Y_{1-z}Ho_zFeO_3$$

where the index z fulfills the condition 0.01<z<0.5, and for preference 0.03<z<008.

The excitation range of these limit luminescent substances lies within the visible region of the spectrum and possibly in the near IR. This range is covered by the radiation range from strong light sources, such as halogen lamps, flash lamps, or similar.

Some examples of the limit luminescence substances according to the invention are explained below in greater detail.

EXAMPLE 1

Manufacture of Holmium-activated Yttrium-aluminium-chromium Mixed Garnet ($Y_{2.7}Ho_{0.3}Cr_{1.2}Al_{3.8}O_{12}$)

47.16 g yttrium oxide ($Y_2O_3$), 29.96 g aluminum oxide ($Al_2O_3$), 14.11 g chromium (III) oxide ($Cr_2O_3$), 8.77 g holmium oxide ($Ho_2O_3$) and 100 g dehydrated sodium sulphate ($Na_2SO_4$) are intimately mixed and heated to 1100° C. in a conundrum crucible for 12 hours in a reducing inert gas atmosphere of carbon monoxide and hydrogen (forming gas).

After cooling, the reaction product is ground, the fluxing agent is washed out with water, and the product dried in air at 100° C. To achieve the finest possible grain size, the powder is then ground in water in a stirring ball mill until an average grain size of less than 1 μm is attained.

After filtration and drying, a light green powder is obtained.

EXAMPLE 2

Manufacture of Holmium-activated Yttrium-gadolinium-iron-aluminum Mixed Garnet ($GdY_{1.78}Ho_{0.22}Fe_3Al_2O_{12}$)

23.68 g gadolinium oxide ($Gd_2O_3$), 26.26 g yttrium oxide ($Y_2O_3$), 13.32 g aluminum oxide ($Al_2O_3$), 31.3 iron oxide ($Fe_2O_3$), 5.43 g holmium oxide ($Ho_2O_3$) and 100 g dehydrated sodium sulphate ($Na_2SO_4$) are intimately mixed and heated to 1100° C. in a corundrum crucible for 12 hours.

After cooling, the reaction product is ground, the fluxing agent is washed out with water, and the product dried in air at 100° C. To achieve the finest possible grain size, the powder is then ground accordingly in water in a stirring ball mill.

After filtration and drying, a light green powder is obtained, with an average grain size of less than 1 μm.

EXAMPLE 3

Manufacture of Holmium-activated Yttrium-chromium-perovskite ($Y_{0.85}Ho_{0.15}CrO_3$)

47.91 g yttrium oxide ($Y_2O_3$), 37.94 g chromium (III) oxide ($Cr_2O_3$), 14.15 g holmium oxide ($Ho_2O_3$) and 100 g dehydrated sodium sulphate ($Na_2SO_4$) is intimately mixed and heated to 1100° C. in a corundrum crucible for 20 hours.

After cooling, the reaction product is ground, the fluxing agent is washed out with water, the sodium chlorate produced as a side-product is reduced with sulfuric acid/iron sulphate to chromium (III) sulphate, and the product dried in air at 100° C. To achieve the finest possible grain size, the powder is then ground accordingly in water in a stirring ball mill.

After filtration and drying, a green powder is obtained, with an average grain size of less than 1 μm.

According to the invention, security against counterfeiting is addititionally increased if the luminescent substance is used at the maximum concentration for the particular valuable document or security element in each case. The maximum concentration depends on a variety of parameters, such as, for examples, the manner in which the valuable document or the security element is applied, or the required properties of the valuable document or security element.

FIG. 3 show s an embodiment of the security element according to the invention. The security element consists in this case of a label 2, composed of a paper or plastic layer 3, a transparent covering layer 4, and an adhesive layer 5. This label 2 is attached via the adhesive layer 5 to any desired substrate 1. This substrate 1 may be documents of inherent value, identity cards, passports, certificates, or similar, as well as other objects requiring security, such as CDs, packing, etc.

The luminescent substance 6 in this embodiment is contained in the volume of the layer 3. If this layer 3 is a paper layer, the limit concentration of luminescent substance according to the invention lies between 0.05 and 1% by weight.

As an alternative, the limit luminescent substance could also be contained in a printing ink, not shown, which is printed on one of the label layers, preferably on the surface of the layer 3. The maximum concentration which, according to the invention, is still just possible, in His case lies within the range from 10 to 30% by weight.

Instead of the iuminescent substance being provided in or on a substrate material, which is then secured to an object as a security element, it is also possible, according to the invention, for the luminescent substance to be provided directly in the valuable document or on its surface in the form of a coating.

What is claimed is:

1. Printed valuable document with at least one authenticity mark in the form of a luminescent substance based on a host lattice doped with at least one rare earth metal, which largely absorbs light and is excitable in the visible region of the spectrum, and is transparent in at least parts of the IR spectral region, whereby the rare earth metal is holmium and the luminescent substance is present in the volume of the valuable document in a concentration of no more than 5 percent by weight.

2. Printed valuable document according to claim 1, wherein the valuable document consists of paper and the luminescent substance is present in the paper in a concentration of between 0.05 and 1% by weight.

3. Printed valuable document with at least one authenticity mark in the form of a luminescent substance based on a host lattice doped with at least one rare earth metal, which largely absorbs light and is excitable in the visible region of the spectrum, and is transparent in at least part ranges of the IR spectral region, whereby the rare earth metal is holmium and the luminescent substance is present in a layer applied to the valuable document in a concentration between 1 and 40% by weight.

4. Printed valuable document according to claim 3, wherein the luminescent substance is provided as an invisible and at least partial coating on the valuable document.

5. Printed valuable document according to claim 3, wherein the luminescent substance is mixed into a printing ink, which contains additional visible colour additives.

6. Printed valuable document according to claim 3, wherein the coating takes the form of one or more stripes.

7. Printed valuable document according to claim 1, wherein the optically transparent range of the host lattice doped with rare earth metals lies in the region between 1 μm and 10 μm.

8. Printed valuable document according to claim 1, wherein the host lattice contains iron or chromium as absorptive elements.

9. Printed valuable document according to claim 1, wherein the host lattice has a garnet or perovskite structure.

10. Printed valuable document according to claim 1, wherein the garnet structure can be described by the general formula $$A_3M_{5-x}Al_xO_{12}$$

where

A stands for an element from the group of yttrium, gadolinim, scandium, and lanthanum;

M stands for iron or chromium;

and the index x fulfills the condition $0<x<4.99$.

11. Printed valuable document according to claim 10, wherein the index x fulfills the condition $0.5<x<2$.

12. Printed valuable document according to claim 10, wherein the luminescent substance can be described by the formula $$Y_{3-z}Ho_zFe_{5-x}Al_xO_{12}$$

where the index z fulfills the condition $0.05<z<2$.

13. Printed valuable document according to claim 9, wherein the garnet structure can be described by the general formula $$A'_{3-y}A_yM_{5-x}Al_xO_{12}$$

where

A, A' stands in each case for an element from the group of yttrium, gadolinium, scandium, and lanthanum;

M stands for iron or chromium; and the index x fulfills the condition $0<x<4.99$, and the index y fulfills the condition $0<y<3$.

14. Printed valuable document according to claim 13, wherein the luminescent substance can be described by the formula $$A'Y_{2-z}Ho_zFe_{5-x}Al_xO_{12}$$

where the index z fulfills the condition $0.05<z<2$.

15. Printed valuable document according to claim 9, wherein the perovskite structure can be described by the general formula $$AMO_3$$

where

A stands for an element from the group of scandium, yttrium, and the lanthanides;

M stands for iron or chromium.

16. Printed valuable document according to claim 15, wherein the luminescent substance can be described by the formula $$Y_{1-z}Ho_zCrO_3$$

where the index z fulfills the condition $0.01<z<0.5$.

17. Printed valuable document according to claim 15, wherein the luminescent substance can be described by the formula $$Y_{1-z}Ho_zFeO_3$$

where the index z fulfills the condition $0.01<z<0.5$.

18. Printed valuable document according to claim 1, wherein the luminescent substance has a quantum yield of 50 to 90%.

19. Security element, which features at least one substrate material and one luminescent substance, based on a host lattice doped with at least one rare earth metal, which largely absorbs and is excitable in the visible region of the spectrum and is transparent at least in parts of the IR spectral region, whereby the rare earth metal is holmium and the luminescent substance is present in the volume of the substrate material in a concentration of no more than 6 percent by weight and said substrate material consists of paper.

20. Security element according to claim 19, wherein the substrate material consists of plastic, and the luminescent substance is present in the plastic in a concentration of no more than 10% by weight.

21. Security element, which features at least one substrate material and one luminescent substance, based on a host lattice doped with at least one rare earth metal, which largely absorbs and is excitable in the visible region of the spectrum and is transparent in at least parts of the IR spectral region, whereby the rare earth metal is holmium and the luminescent substance is present in a layer applied onto the substrate material in a concentration in the range between 1 and 40% by weight; with the proviso that said luminescent substance is present in a printing ink.

22. Security element according to claim 19, wherein the security element has the form of a stripe or band.

23. Security element according to claim 22, wherein the substrate material is formed as a security thread or mottling fiber.

24. Security element according to claim 19, wherein the security element is in the form of a label.

25. Printed valuable document according to claim 3, wherein the layer applied to the valuable document is a printing ink, in which the luminescent substance is present in a concentration of between 10 and 30% by weight.

26. Printed valuable document according to claim 12, wherein the luminescent substance can be described by the formula $$Y_{3-z}Ho_zFe_{5-x}Al_xO_{12}$$

where the index z fulfills the condition $0.15<z<0.25$.

27. Printed valuable document according to claim 13, wherein the garnet structure can be described by the general formula $$A'_{3-y}A_yM_{5-x}Al_xO_{12}$$

where

A, A' stands in each case for an element from the group of yttrium, gadolinium, scandium, and lanthanum;

M stands for iron or chromium; and the index x fulfills the condition $0.5<x<2$ and the index y fulfills the condition $0<y<3$.

28. Printed valuable document according to claim 14, wherein the luminescent substance can be described by the formula $$A'_{3-y}A_yM_{5-x}Al_xO_{12}$$

where the index z fulfills the condition $0.15<z<0.25$.

29. Printed valuable document according to claim 16, wherein the luminescent substance can be described by the formula $$Y_{1-z}Ho_zCrO_3$$

where the index z fulfills the condition $0.03<z<0.08$.

30. Printed valuable document according to claim 17, wherein the luminescent substance can be described by the formula $$Y_{1-z}Ho_zFeO_3$$

where the index z fulfills the condition $0.03<z<0.08$.

31. Security element according to claim 19, wherein the substrate material consists of paper and the luminescent substance is present in the paper in a concentration of no more than between 0.05 and 1% by weight.

32. Security element according to claim 21, wherein the luminescent substance is present in a printing ink in a concentration of between 10 and 30% by weight.

* * * * *